(12) United States Patent
Boe

(10) Patent No.: US 8,894,787 B2
(45) Date of Patent: Nov. 25, 2014

(54) COMPOSITE PANEL WITH FIXED VOID CONTENT AND METHODS OF MAKING SAME

(75) Inventor: Bryce Boe, Peck, KS (US)

(73) Assignee: Textron Innovations, Inc., Providence, RI (US)

( * ) Notice: Subject to any disclaimer, the term of this patent is extended or adjusted under 35 U.S.C. 154(b) by 174 days.

(21) Appl. No.: 13/593,119

(22) Filed: Aug. 23, 2012

(65) Prior Publication Data

US 2014/0053975 A1    Feb. 27, 2014

(51) Int. Cl.
*B32B 38/10* (2006.01)
*B29C 65/00* (2006.01)

(52) U.S. Cl.
CPC .............. *B32B 38/10* (2013.01); *B29C 66/723* (2013.01)
USPC ....................................... 156/155; 156/307.1

(58) Field of Classification Search
CPC .. B29C 66/721; B29C 66/723; B29C 66/727; B23B 38/10
USPC ............................................... 156/155, 307.1
See application file for complete search history.

(56) References Cited

U.S. PATENT DOCUMENTS

| | | | |
|---|---|---|---|
| 3,980,747 A | | 9/1976 | Nakagawa et al. |
| 4,439,391 A | * | 3/1984 | Hung ............................ 264/317 |
| 5,490,602 A | * | 2/1996 | Wilson et al. ................... 216/56 |
| 6,270,788 B1 | * | 8/2001 | Koulik et al. ................. 424/423 |
| 6,684,701 B2 | | 2/2004 | Dubois et al. |
| 2010/0077698 A1 | | 4/2010 | Tinianov |

\* cited by examiner

*Primary Examiner* — Christopher Schatz
*Assistant Examiner* — Scott W Dodds
(74) *Attorney, Agent, or Firm* — Lathrop & Gage LLP

(57) ABSTRACT

A method for a composite panel having a desired void content is disclosed. The method comprises the step of laying on a surface a first ply of resin. A first filament is placed on the first ply, and a second ply of resin is laid on the first ply and the first filament to form a first intermediate composite panel. The first intermediate composite panel is cured in an autoclave to form a second intermediate composite panel. The second intermediate composite panel is submerged in a solution that dissolves the first filament.

22 Claims, 10 Drawing Sheets

FIG. 5

| Col/Row | A Section No. | B Suture Radius | C Suture Area | D Thickness of cured panel | E Width of cured section | F Area of side of cured section | G Void Content Target | H Void area | I Total sutures in section | J Sutures per ply | K Distance between sutures in one ply | L Suture stagger spacing |
|---|---|---|---|---|---|---|---|---|---|---|---|---|
| 1 | 302 | 0.00775 | 0.000189 | 0.0962 | 2.87 | 0.276094 | 1.50% | 0.004141 | 21.96 ≈ 22 | 2 | 1.44 | 0.130697 |
| 2 | 304 | 0.00775 | 0.000189 | 0.0962 | 2.59 | 0.249158 | 2.50% | 0.0062 | 33.03 ≈ 33 | 3 | 0.86 | 0.078418 |
| 3 | 306 | 0.00775 | 0.000189 | 0.0962 | 1.85 | 0.17797 | 3.50% | 0.0062 | 33.03 ≈ 33 | 3 | 0.62 | 0.056013 |
| 4 | 308 | 0.00775 | 0.000189 | 0.0962 | 2.876 | 0.276671 | 4.50% | 0.0125 | 66.02 ≈ 66 | 6 | 0.48 | 0.043566 |
| 5 | 310 | 0.00775 | 0.000189 | 0.0962 | 2.353 | 0.226359 | 5.50% | 0.0124 | 66.01 ≈ 66 | 6 | 0.39 | 0.124497 |

US 8,894,787 B2

COMPOSITE PANEL WITH FIXED VOID CONTENT AND METHODS OF MAKING SAME

CROSS-REFERENCE TO RELATED APPLICATIONS

None.

FIELD OF THE INVENTION

The invention relates generally to the field of composite panel manufacture. More specifically, the invention relates to the field of manufacturing composite panels having a predetermined void content.

BACKGROUND

Composite panels are well known in the aerospace industry. For example, composite panels may be used to design, build, and/or test components for aircraft. People of skill in the art appreciate that these panels may have a certain void content or percentage of porosity, which, while generally undesirable, is an unavoidable byproduct of the processes used to manufacture the composite panels. The void content of a composite panel may adversely affect several of its properties, including the panel's mechanical and thermal properties. For example, studies have shown that the interlaminar shear strength of panels manufactured from fiber reinforced polymer composite materials decreases by 7% per 1% of voids up to a total void content of about 4%.

To ensure that a composite panel's void content does not exceed a set maximum, the composite panels, after they are manufactured, may be tested by using one or more destructive tests. Determination of the void content of a panel by destructive testing, however, may leave the composite panel unusable for its intended purposes. Thus, some manufacturers may manufacture a "witness coupon" with the composite panel (i.e., they may manufacture a composite panel that exceeds the required length of the panel, and cut off this excess length (the witness coupon) for conducting destructive testing). This too, however, is undesirable, as it leads to wastage of material and unnecessarily increases the cost of manufacturing the panels.

Nondestructive testing techniques for determining the void content of a composite panel have thus, in recent years, gained popularity. U.S. Pat. No. 6,684,701 to Dubois et al. outlines some nondestructive methods for testing for the void content of composite panels. The void content of the panels may be determined, for instance, by using reflected through transmission ultrasound (RTTU) or by through transmission ultrasound (TTU). More specifically, amplitude of an ultrasound wave that has propagated through a composite panel may be compared to the amplitude of an ultrasound wave that has propagated through a reference sample having a known void content. For example, where it is desired that a composite panel have a void content of less than 4%, a reference panel having a 4% void content may be used for comparison with the composite panel. But, manufacturing composite panels having a fixed void content (e.g., for use as a reference panel, or for construction, design, etc.) has heretofore been an arduous task. The present invention discloses systems and methods for creating composite panels having a predetermined, close tolerance, evenly distributed void content.

SUMMARY

Methods of making composite panels having desired void contents are disclosed herein. According to one embodiment, a method for making a composite panel having a desired void content comprises the step of laying on a surface a first ply of resin. A first filament is placed on the first ply, and a second ply of resin is laid on the first ply and the first filament to form a first intermediate composite panel. The first intermediate composite panel is cured in an autoclave to form a second intermediate composite panel. The second intermediate composite panel is submerged in a solution that dissolves the first filament.

According to another embodiment, a method for manufacturing a composite panel having a desired void content comprises the step of laying on a surface a first ply of resin. The first ply has a predetermined length and height, and the first ply is provisionally divided along its length into a first section and a second section. A first filament and a second filament is placed on the first section. A length of the first filament and a length of the second filament is at least equal to the height of the first ply. A third filament and a fourth filament is placed on the second section, and a length of the third filament and a length of the fourth filament is at least equal to the height of the first ply. A distance between the third filament and the fourth filament is greater than a distance between the first filament and the second filament. A second ply is laid atop the first ply and the first, second, third, and fourth filaments to form a first intermediate composite panel. The first intermediate composite panel is then cured in an autoclave to form a second intermediate composite panel. The second intermediate composite panel is submerged in a solution that dissolves the first, second, third, and fourth filaments. Void space is left in the composite panel due to absorption of the filaments.

According to yet another embodiment, a method for making a multi-ply composite panel having a desired void volume comprises the step of laying on a surface a first ply of resin having a predetermined length and height. The first ply is provisionally divided along its length into a first section, a second section, and a third section. A first filament and a second filament is placed on the first section. A length of the first filament and a length of the second filament is at least equal to the height of the first ply. A third filament and a fourth filament is placed on the second section. The length of the third filament and the length of the fourth filament is at least equal to the height of the first ply. The distance between the third filament and the fourth filament is greater than a distance between the first filament and the second filament. A fifth filament and a sixth filament is placed on the third section. The length of the fifth filament and the length of the sixth filament is at least equal to the height of the first ply. A distance between the fifth filament and the sixth filament is greater than a distance between the third filament and the fourth filament. A second ply of resin is laid atop the first ply and the first, second, third, fourth, fifth and sixth filaments. The second ply is provisionally divided along its length into a fourth section, a fifth section, and a sixth section. The fourth section is upwardly adjacent the first section, the fifth section is upwardly adjacent the second section, and the sixth section is upwardly adjacent the third section. A seventh filament and an eighth filament is placed on the fourth section. The length of the seventh filament and the length of the eighth filament is at least equal to the height of the second ply. A ninth filament and a tenth filament is placed on the fifth section. The length of the ninth filament and the length of the tenth filament is at least equal to the height of the second ply. A distance between the ninth filament and the tenth filaments is greater than a distance between the seventh filament and the eighth filament. An eleventh filament and a twelfth filament is placed on the sixth section. The length of the eleventh filament and the length of the twelfth filament is at least equal to the height of the second ply. A distance between the eleventh filament and the twelfth filaments is greater than a distance between the ninth filament and the tenth filament. A third play is laid atop the second ply and the seventh, eighth, ninth, tenth, eleventh, and twelfth filaments to form to form a first intermediate composite panel. The first intermediate panel is cured in an autoclave to form a second intermediate composite panel. The second intermediate panel is submerged in a solution that dissolves all the filaments.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 outlines certain values used in manufacturing of the multi-ply panel of FIG. 4.

DETAILED DESCRIPTION

Figure 1:
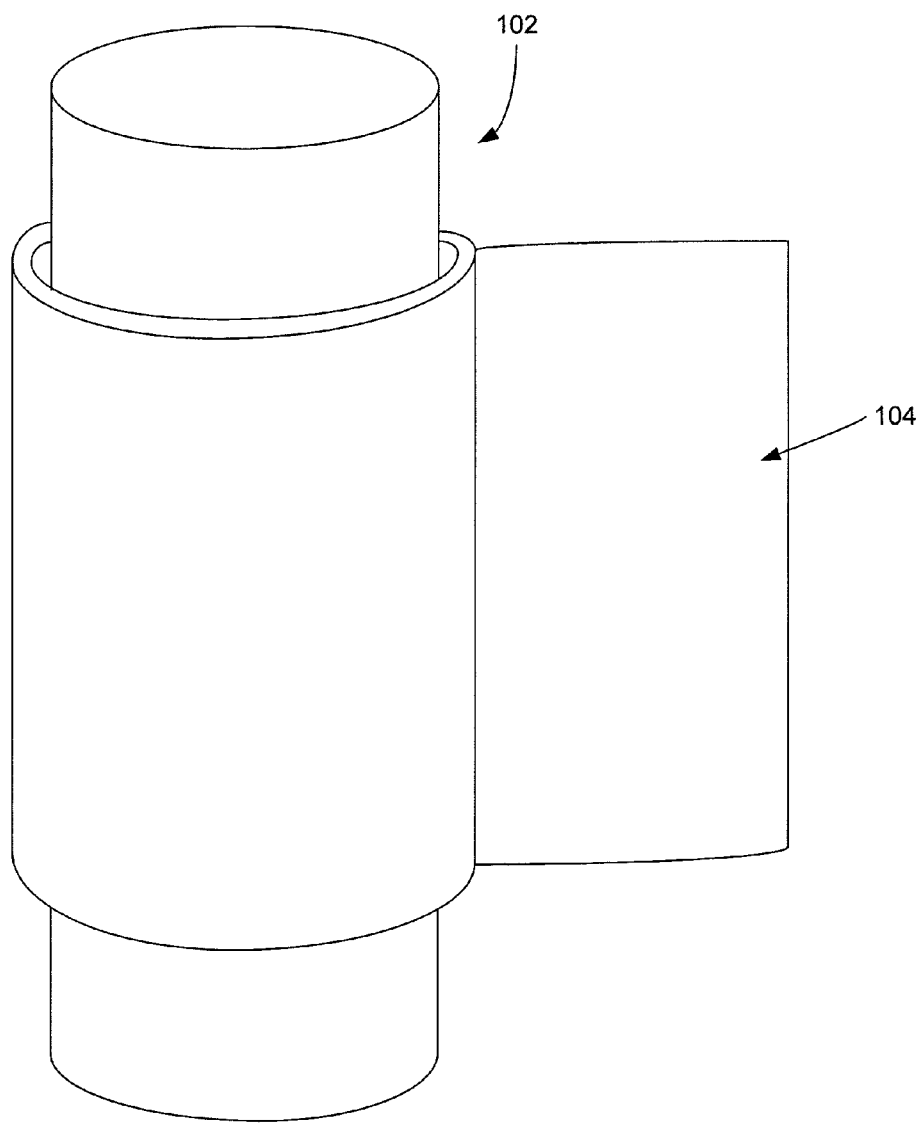
FIG. 1 is a perspective view of a roll of resin for making a composite panel.

Embodiments of the present invention provide systems and methods for manufacturing composite panels having a desired void content. Composite panels, such as graphite-epoxy composite panels, are used extensively in the aerospace industry. For example, these panels may be used to build aircraft parts such as the fuselage, wings, propellers, et cetera.

Both the manufacturing processes utilized to create composite panels, and the panels' material constituents, may cause these panels to have a certain void content (or void volume, void content, porosity, et cetera). For example, when the curing of composite panels is advanced too quickly, voids may be formed from the vapor of the resin or solvent. Further, some of the resin ingredients may be volatilized and may escape if the temperature steps of the cure cycle exceed the rate at which the cross-linking occurs during polymerization, leaving behind void spaces. These void spaces may affect several characteristics of the composite panel. For example, the void spaces may collectively weaken the panel and diminish its compressive strength, shear strength, longitudinal and transverse tensile strength, et cetera. The void spaces may also impair the panel's durability, particularly at higher temperatures, increase its moisture absorption, and render the panel less resistant to fatigue.

Composite panels that are used to make aircraft components must meet several stringent criteria to ensure that these panels will successfully withstand the forces and elements expected to be encountered by an aircraft. The void content of the panels is one such important criteria, and because void spaces are a perennial problem in composite panel manufacturing, many aircraft panels are discarded before use because their void content is greater than the maximum allowed. Indeed, some aircraft part manufacturers may scrap as much as 10% of the panels they manufacture because of the panels' failure to meet their void content limitations.

Several testing methods may be employed to determine the void content of a composite panel. Broadly, these methods may be divided into destructive testing methods and non-destructive testing methods. Destructive testing methods may include resin burnout tests, acid digestion tests, thermogravimetric tests, et cetera. For example, with respect to a graphite epoxy panel, resin burnout tests may involve heating the graphite epoxy composite to over 400° C. for several hours such that the epoxy resin burns out, leaving the graphite fibers unaffected. Acid digestion testing methods may involve dissolving the panel into an acid sample (e.g., a nitric acid sample) and then analyzing this solution against a known background solution (e.g., an acid/water solution). Such destructive methods, however, are running into disfavor because they may render the panel unusable. To avoid this problem, some manufacturers may manufacture the composite panels with extra length (i.e., a witness coupon), which can be cut off from the rest of the panel and tested separately without destroying the panel. This method, however, results in wastage of material and increases the cost of manufacturing the panels.

Non-destructive testing methods allow the panel to be tested in a manner that does not render it unusable. These methods may include, for example, direct imaging, correlation with a single ultrasonic frequency (i.e., a narrowband approach), correlation with ultrasound frequency slope (i.e., a broadband approach), et cetera. Ultrasonic tests may involve measuring the attenuation of ultrasonic waves as they pass through composite panels. This attenuation may increase with increasing void content, as the ultrasound waves travel poorly through void space. The attenuation of the ultrasound waves caused by one panel may then be compared with the attenuation of the ultrasound waves caused by a reference panel having a known void content. Consider, for example, that a 2 inch wide graphite epoxy composite panel needs to have a void content of 4% or less to be useable, as a void content of greater than 4% would render the panel unsafe for its intended purpose. Assume that a 2 inch wide reference panel attenuates 5 MHz ultrasound waves by 1.5 dB. Thus, if the 2 inch wide composite panel attenuates 5 MHz ultrasound waves by 1 dB, for example, the manufacturer may be assured that the composite panel has an acceptable void content. Conversely, if the composite panel attenuates the 5 MHz ultrasound waves by 3 dB, for example, then the manufacturer may recognize that the panel has an unacceptably high void content.

It will be appreciated by those skilled in the art that depending on the end use, composite panels may have different void content requirements. For example, a first composite panel may need to have a void content of less than 5%, a second composite panel may need to have a void content of less than 4%, and a third composite panel may need to have a void content requirement of less than 3%, depending on the end use of these panels. And, each of these first, second, and third panels may require a unique reference panel against which can it be tested. For example, the first panel may be tested against a reference panel that has a void content of 5%, the second panel may be tested against a reference panel that has a void content of 4%, and the third panel may be tested against a reference panel that has a void content of 3%.

Manufacturing of these uniquely porous reference panels against which the different composite panels may be tested can be a cumbersome process. Specifically, as noted, void content is an inherent byproduct of the manufacturing process, and as such, to manufacture a panel with a fixed void content (e.g., a void content of exactly 4%) may take several attempts. Further, unless the reference panel is tested destructively, a different reference panel may be required to test the void content of the reference panel. A method for conveniently manufacturing reference panels having a fixed void content, thus, would be highly advantageous, as it would eliminate the need to create reference panels having a particular void content by trial and error. The method would be even more useful if different sections of the same reference panel could be made to have different (and known) void contents, as then, the same reference panel may be used to test multiple composite panels having different void content requirements. The present invention is directed to such a method.

Attention is now directed to FIG. 1, which shows a roll 102 of material 104 for creating a composite panel. The material 104 may be any type of material suitable for making composite panels, such as fiber reinforced polymer composite material, pre-impregnated graphite epoxy resin, et cetera. Assume for the purpose of illustration that the material 104 is pre-impregnated graphite epoxy resin, having a nominal cure thickness of 0.2 inches per ply. Also assume that a manufacturer desires to create a composite panel that has a width of 1 inch and a length of 10 inches.

Figure 2A:
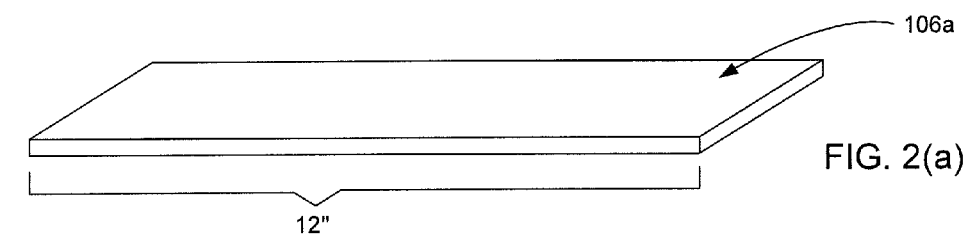
FIGS. 2(a)-2(e) depict the manufacture of a multi-ply composite panel according to prior art methods.

As people of skill in the art appreciate, a composite panel from this resin 104 is conventionally made as follows. First, a length of the tacky resin (i.e., a first ply 106a) is unrolled from the roll 102, cut from the roll 102, and laid down on a table or other such surface (FIG. 2(a)). If the desired panel length is 10 inches, the length of the resin 104 that is laid down may be 10 inches, or a greater length could be used so that once the panel is cured, its edges can be cut off to yield a smoother panel; similarly, a greater length could be used to provide for a witness coupon. Assume that a length of 12 inches of resin 104 is used, as shown in FIG. 2(a).

Figure 2B:
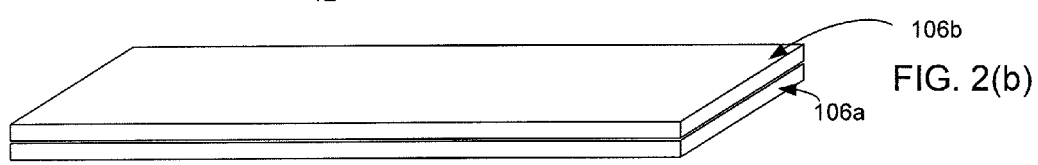
Figure 2C:
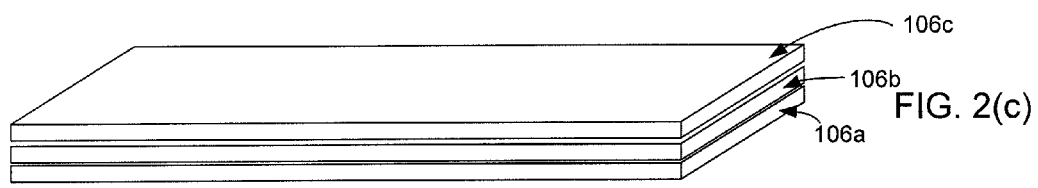
Figure 2D:
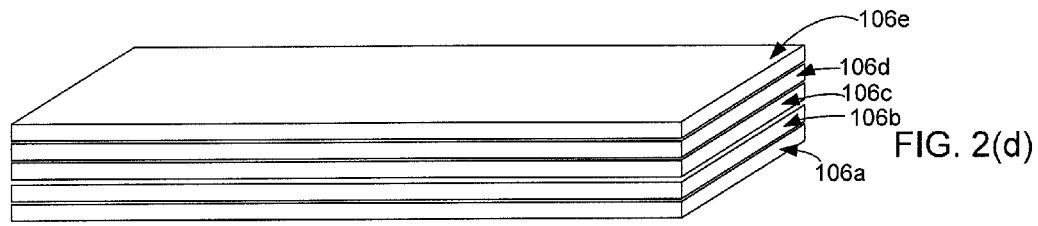
Figure 2E:
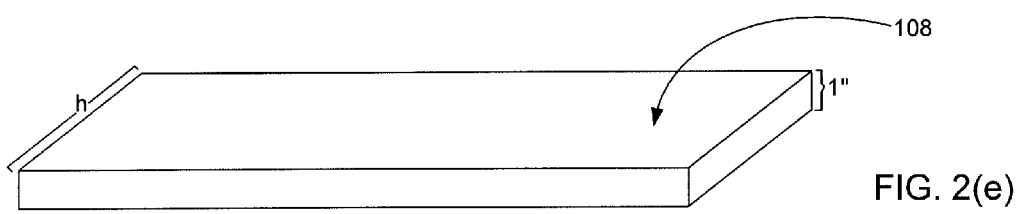

As the desired width of the panel is 1 inch, and because a ply has a nominal cure thickness of 0.2 inches, it will be appreciated that the finished panel would require five plies. So, after the first ply 106a is laid down, a second ply 106b having a length of 12 inches may be unrolled from the roll 102, cut, and laid atop the first ply 106a as shown in FIG. 2(b). Next, as shown in FIG. 2(c), a third ply 106c may be laid atop the second ply 106b. The process may be repeated for a fourth ply 106d and a fifth ply 106e, as shown in FIG. 2(d). The five plies 106a-106e may next be placed inside a vacuum bag which holds the plies 106a-e together, and then, the plies 106a-106e may be cured by using an autoclave. As people of skill in the art appreciate, the autoclave applies a high pressure (e.g., 85 PSI or higher) to the tacky resin plies 106a-106e, and in conjunction with the vacuum bag, causes the plies 106a-106e to cure and harden into a finished composite panel 108 as shown in FIG. 2(e), which, in this example, is approximately an inch thick and has a length of about 12 inches. The excess length (i.e., 2 inches) may then be cut off to yield a panel that has the desired length of 10 inches. A height h of the panel 108 may similarly be adjusted, if desired.

Attention is now directed to FIG. 3, which shows, in general, how a given void content may be introduced in an exemplary four ply panel. Specifically, as shown in FIG. 3(a), initially, a first ply 202(a) of a height H and desired length L of resin 104 may be cut off from the roll 104 and laid on a table or other such surface. Next, as shown in FIG. 3(b), strands of material 204 may be placed along the length of the first ply 202a at regular (or irregular) intervals. The material 204 may be, for example, biologic material such as sutures, or other desirable material that can be readily absorbed in a solution that does not react with or otherwise affect the resin 104. In the preferred embodiment, the material 204 consists of chromic gut sutures. As is known, chromic gut sutures 204 readily absorb in proteases enzyme solutions.

Figure 3A:
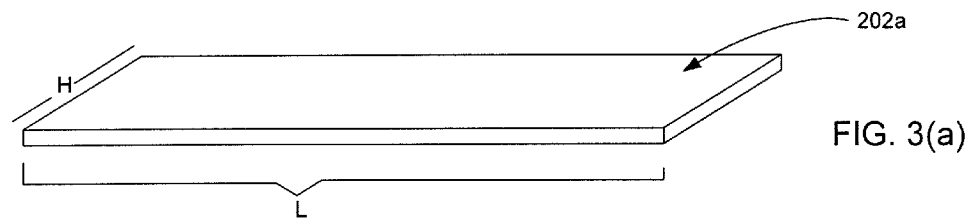
FIGS. 3(a)-3(i) outline, in accordance with the teachings of the current invention, the manufacture of a multi-ply composite panel having a desired void content.
Figure 3B:
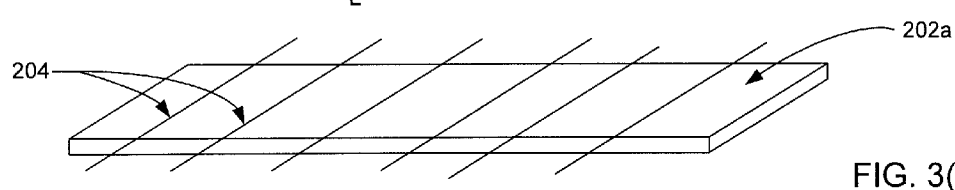
Figure 3C:
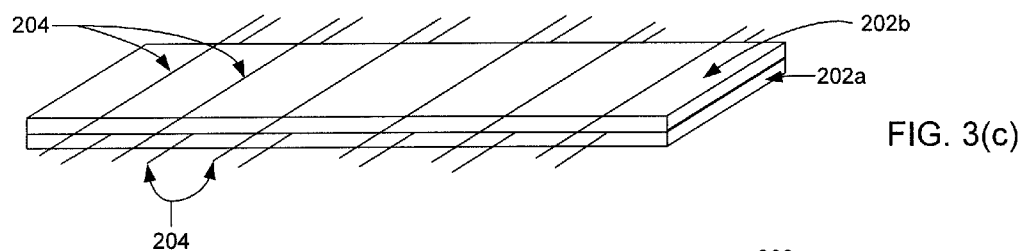
Figure 3D:
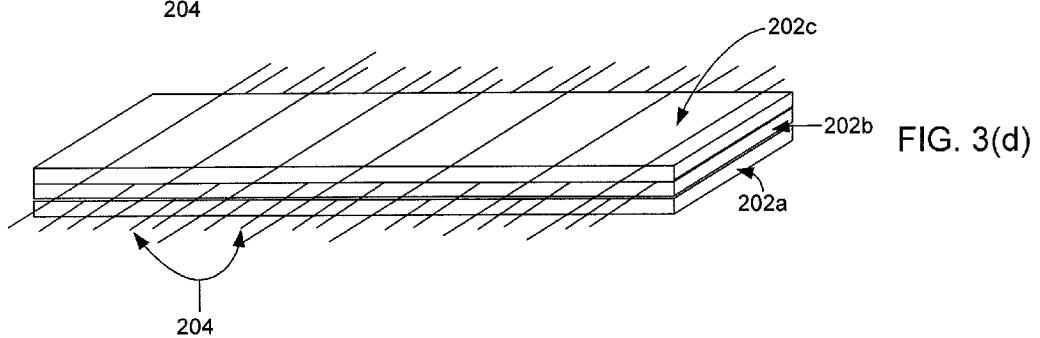
Figure 3E:
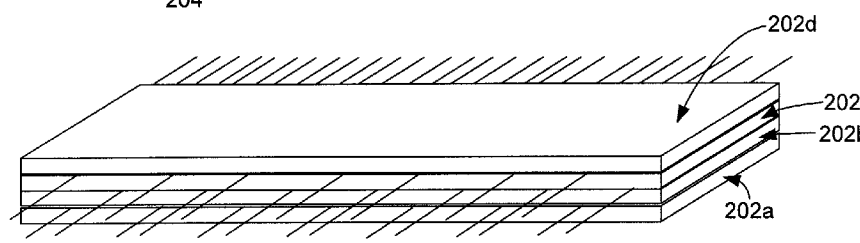

Next, as shown in FIG. 3(c), a second ply 202b may be placed above the first ply 202a to form a 2-ply laminate, and then, additional sutures 204 may be placed atop the second ply 202b. A suture 204 atop the second ply 202b may be directly above a suture 204 resting on the first ply 202a; however, as will become clear from the disclosure herein, to ensure that the void content is not confined to a specific area in the panel, it may be desirable to space apart the sutures 204 such that a suture 204 atop the second ply 202b is not directly above a suture 204 on the first ply 202a. Then, as shown in FIG. 3(d), a third ply 202c may be placed atop the second ply 202b to form a 3-ply laminate, and additional sutures 204 may be placed on the third ply 202c. A fourth and final ply 202d may then be placed atop the third ply 202c to form a 4-ply laminate, as shown in FIG. 3(e).

Figure 3F:
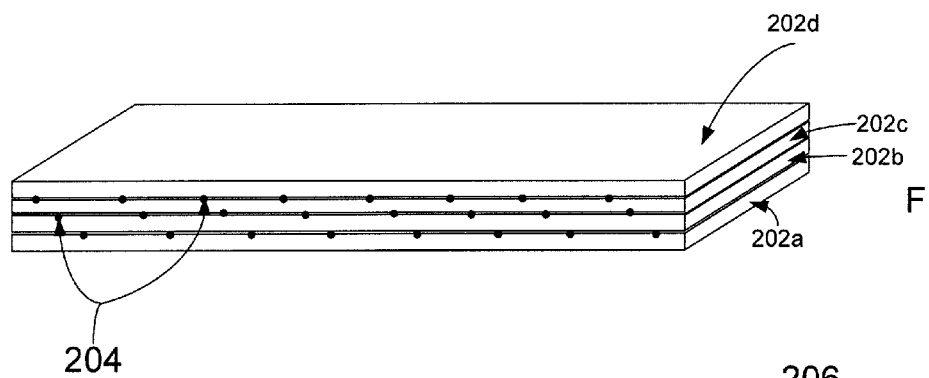
Figure 3G:
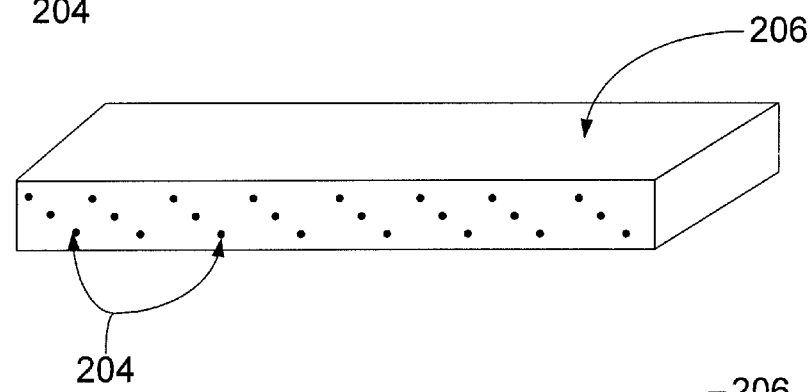

The edges of the chromic gut sutures 204 may thereafter be cut such that the length of the sutures 204 corresponds to the height H of the plies. That is, the chromic gut sutures 204 may be cut such that they do not extend beyond the plies, as shown in FIG. 3(f). The four plies 202a, 202b, 202c, 202d, along with the chromic gut sutures 204 therebetween (i.e., the 4-ply laminate), may then be collectively placed in a vacuum bag and cured in an autoclave. During the cure cycle, the sutures 204 may displace the resin 104 and integrate with the cured panel 206, as shown in FIG. 3(g).

Figure 3H:
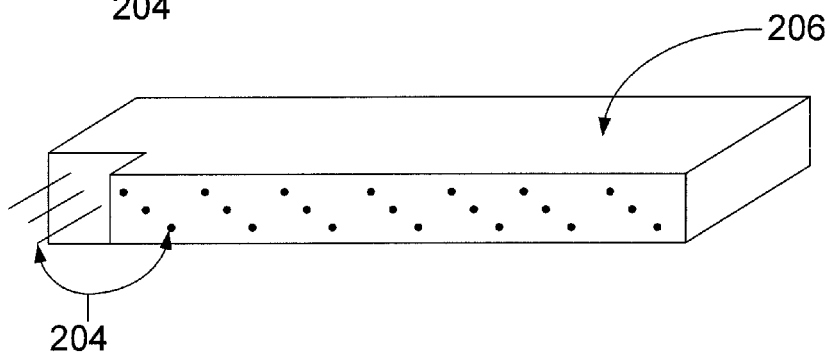
Figure 3I:
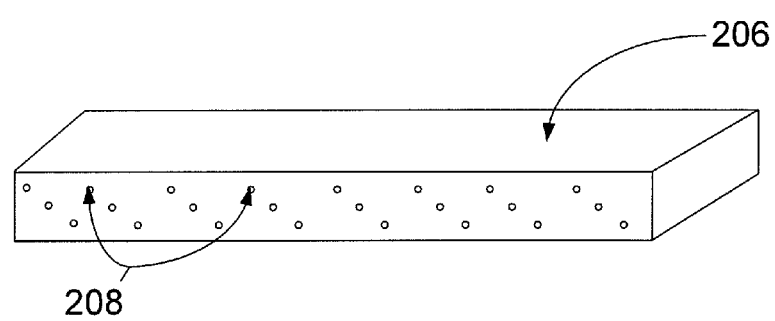

Next, as shown in FIG. 3(h), the cured panel 206 may be trimmed to expose all the chromic gut sutures 204. The trimmed panel may then be submerged into a solution that absorbs the material 204. For example, where the material 204 comprises chromic gut sutures, the panel 206 may be submerged in a proteases enzyme solution. The solution may absorb all the sutures 204, leaving void spaces 208 in their place (see FIG. 3(i)). As can be appreciated, the diameter, volume, and location of these void spaces 208 may correspond to the diameter, volume, and location of the sutures 204, respectively. Further, the total void volume of the panel 206 may generally correspond to the total volume of all the absorbed sutures 204. In this way, thus, the panel 206 may be made to have a particular, fixed, and evenly distributed void content. The void content of the panel 206 may be adjusted by changing the size and number of sutures 204 that are placed in between the plies before curing.

As noted, prior to this invention, it may have taken multiple tries (i.e., multiple curing cycles) to create a composite panel with a certain, fixed void content. The current invention eliminates this problem. What is more, the invention allows different sections of the same composite panel to have different, fixed void contents, thereby allowing for the manufacture, via a single curing cycle, of a reference panel that can be used as a reference against multiple composite panels having different void content limitations. This embodiment of the method may be illustrated with an example.

Consider, for example, that five different composite panels need to be tested. The first composite panel needs to have a void content of less than or equal to 1.5%, the second composite panel needs to have a void content of less than or equal to 2.5%, the third composite panel needs to have a void content of less than or equal to 3.5%, the fourth composite panel needs to have a void content of 4.5% or lower, and the fifth composite panel needs to have a void content of less than or equal to 5.5%. To test these five panels, it is desired that a 0.0962 inch thick multi-ply reference panel having five sections be created, the void content of each section corresponding to the maximum allowable void content of one of the five composite panels. Assume that the chromic gut sutures have a radius of 0.00775 inches, and that the section having a void content of 1.5% (section 302) needs to be 2.87 inches wide, the section having a void content of 2.5% (section 304) needs to be 2.59 inches wide, the section having a void content of 3.5% (section 306) needs to be 1.89 inches wide, the section having a void content of 4.5% (section 308) needs to be 2.876 inches wide, and the section having a void content of 5.5% (section 310) needs to be 2.353 inches wide. Finally, assume that the manufacturer of the resin 104 provides that 12 plies of the resin 104, once cured, would form a panel that is 0.0962 inches thick.

Figure 4A:
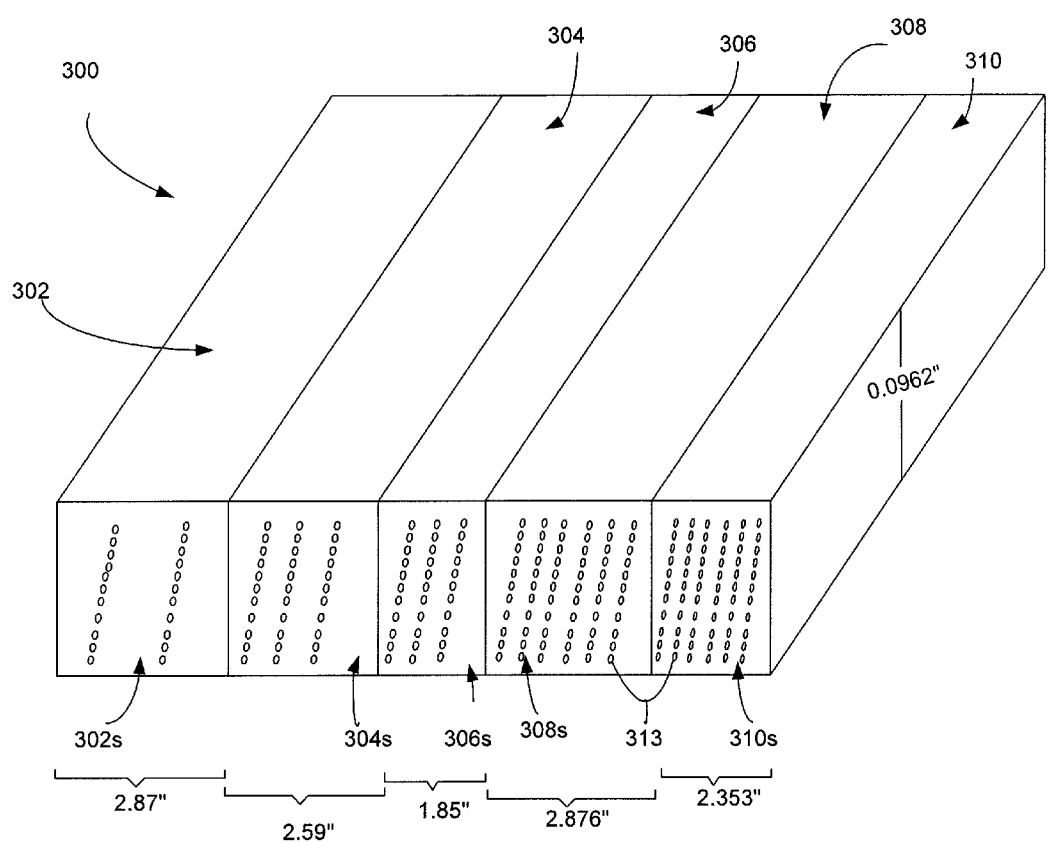
FIGS. 4(a)-4(g) outline, in accordance with the teachings of the current invention, the manufacture of a multi-ply panel having sections with different void contents.

Attention is now directed to FIG. 4(a), which shows a finished panel 300 created by using the methods disclosed herein. It will be appreciated that FIG. 4(a) (and the other figures) are not drawn to scale to highlight certain features of the invention. As can be seen, the panel 300 has sections 302, 304, 306, 308, 310 each having a side 302s, 304s. 306s, 308s, and 310s, respectively. The width of sections 302, 304, 306, 308, 310 is 2.87, 2.59, 1.85, 2.876, and 2.353, respectively, and the void content of these sections is 1.5%, 2.5%, 3.5%, 4.5%, and 5.5%, respectively, as desired. Void spaces 313 left behind in each section after the chromic gut sutures have been absorbed therefrom are visible in this figure.

Figure 4B:
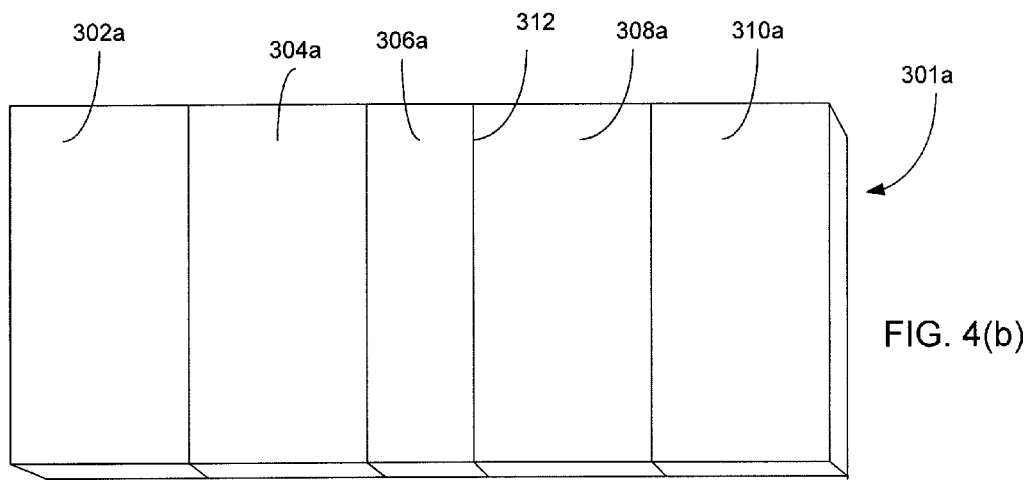

The process of creating this panel 302 will now be described, with reference first to FIG. 4(b). As the combined width of the five sections 302-310 is 12.54 inches (i.e., 2.87 +2.59+1.85+2.876+2.353=12.54), a first ply 301a of resin 104 having a length of 12.54 inches (or greater) may be unrolled from the roll 102 and laid down on a surface. Next, the ply 301a may be temporarily divided into sections 302a, 304a, 306a, 308a, and 310a according to the required width of each section; for example, rulers (or strips, threads etc.) may be placed on the ply 301a to demarcate the boundaries of sections 302a-310a. It will be appreciated that 11 plies (304b-304l) of resin 104 may eventually be placed atop the first ply 301a to create the 12 ply panel 300 that, after cure, yields the desired thickness of 0.0962 inches; for example, section 302 may comprise, after cure, section 302a of the first ply 301a (FIG. 4(b)), section 302b of a second ply 301b (FIG. 4(f)), and while not specifically shown in the figures, section 302c of a third ply 301c, section 302d of a fourth ply 301d, section 302e of a fifth ply 301e, section 302f of a sixth ply 301f, section 302g of a seventh ply 301g, section 302h of an eight ply 301h, section 302i of a ninth ply 301i, section 302j of a tenth ply 301j, section 302k of an eleventh ply 301k, and section 302l of a twelfth ply 301L. Similarly, section 304 may comprise, after cure, sections 304a-l of plies 301a-l, respectively, section 306 may comprise sections 306a-l of plies 301a-l, respectively, and so on.

The number of sutures that will need to be placed on each section 302a, 304a, 306a, 308a, and 310a of the first ply 301a may next be computed as shown in the spreadsheet in FIG. 5. It may be desirable to refer to some discrete cells of the spreadsheet while detailing the process; these discrete cells will be referred to herein by their column and row numbers. For example, cells E1 and E2 outline that that the width of cured section 302 and 304 (FIG. 4(a)) is 2.87 and 2.59 inches, respectively.

As the radius of the sutures 204 (FIG. 3(c)) is 0.0075 inches, the area of the sutures is 0.0001886 inches, as outlined in Column C (i.e., 0.0075^2*pi=0.0001886). The thickness of the cured panel 300, as listed in Column D, is 0.0962 inches. Thus, area of sides 302s, 304s, 306s, 308s, and 310s (see FIG. 4(a)) of the finished panel 300 may be estimated. Specifically, side 302s may have an area, after cure, of 0.276094 square inches as outlined in Cell F1 (i.e., 0.0962 (thickness)*2.87 (width)=0.276094). Similarly, side 304s may have an area, after cure, of 0.249158 square inches as outlined in Cell F2 (i.e., 0.0962*2.59=0.249158), side 306s may have an area, after cure, of 0.17797 square inches as outlined in Cell F3 (i.e., 0.0962*1.85=0.17797). As will be appreciated, area of sides 308s and 310s of the finished panel 300 may similarly be estimated to be 0.276671 and 0.226359 square inches, as outlined in Cells F4 and F5, respectively.

As it is known that the sutures 204 will eventually be absorbed and leave void spaces 313 in the sides 302s, 304s, 306s, 308s, and 310s that have an area equal to the area of the sutures 204, the number of sutures to be placed above the first ply 301a may be calculated. More specifically, with reference to section 302, it is known that the area of the side 302s of the finished panel 300 will be about 0.276094 square inches, and that 1.5% of this area needs to be void space. Thus, the total void area in side 302s needs to be 0.004141 square inches as shown in cell H1 (i.e., 1.5/100*0.276094=0.004141). And, to create a void area in side 302 of 0.004141 square inches, 22 sutures (204) may be required (i.e., required void area/area of one suture=number of required sutures; and 0.004141/ 0.0001886=21.96≈22 sutures) as shown in cell I1. These 22 sutures (204), however, need to be divided amongst the 11 plies 301a-301 as it will be appreciated that no sutures will be placed above the twelfth ply 301l. Thus, two sutures 204 must be placed above section 302a of the ply 301a, two sutures 204 must be placed above section 302b of ply 301b, two sutures 204 must be placed above section 302c of ply 301c, and so on, as outlined in cell J1 (i.e., 22 sutures/11 plies=2 sutures/ply).

Figure 4C:
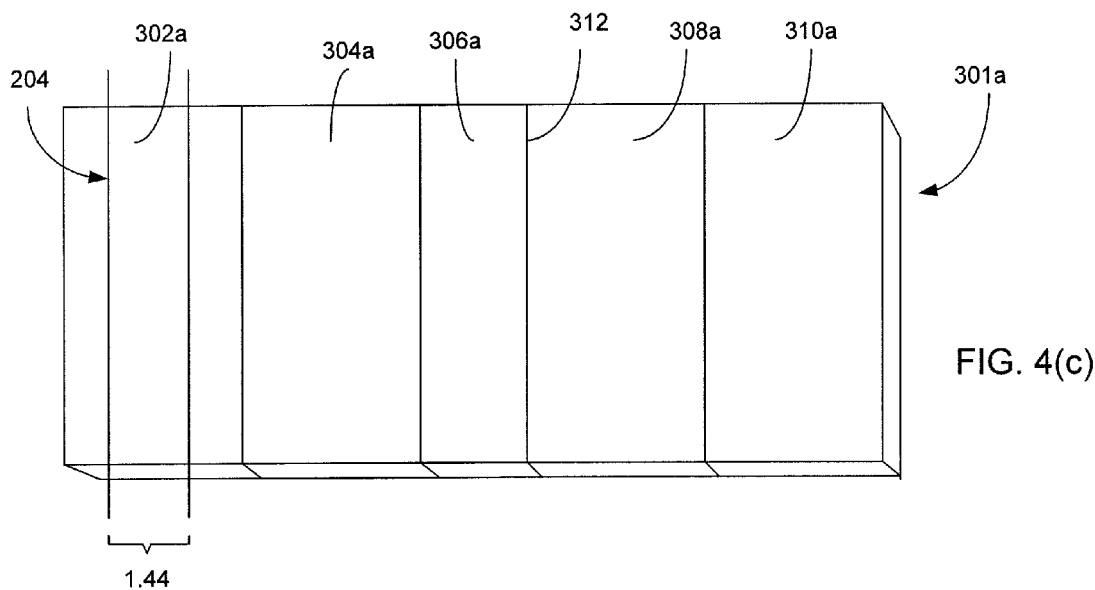

Finally, the distance between these two sutures 204 that are placed above the first ply 301a on section 302a may be calculated. As it is known that the width of section 302a is 2.87 inches, the two sutures 204 may be spaced 1.44 inches apart (i.e., 2.87/2=1.44). This spacing between the sutures 204 may ensure that the void content in the finished panel 300 is more evenly distributed. Based on these calculations, as shown in FIG. 4(c), two sutures 204 spaced 1.44 inches apart may be placed on section 302a of the first ply 301a.

Figure 4D:
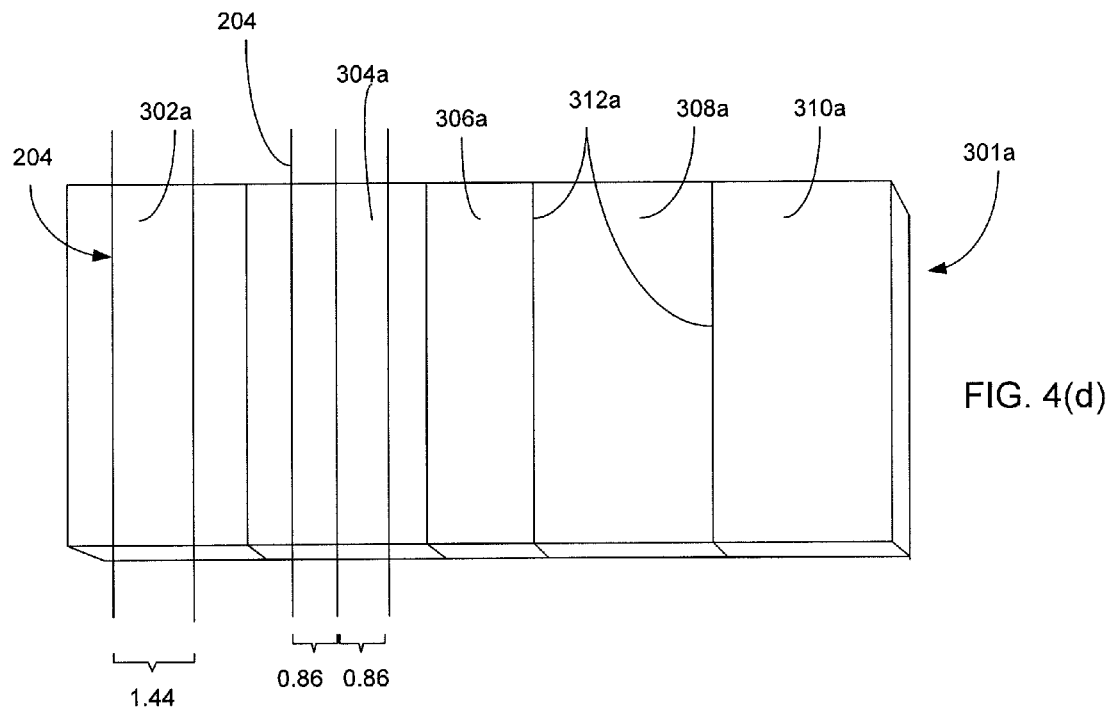

Similarly, the number of sutures 204 that are to be placed above section 304a (and the remaining sections 306a, 308a, and 310a) of the first ply 301a may be calculated. For example, it is known that side 304s will have an area, after cure, of about 0.249158 square inches, and that 2.5% of this area needs to be void content. Thus, the void area of side 304s needs to be about 0.00622895 square inches (i.e., 2.5/ 100*0.249158=0.00622895). To create this void area, 33 sutures 204 may be required (i.e., 0.00622895/ 0.0001886=33.02≈33 sutures). And, to divide these 33 sutures evenly amongst the 11 plies 301a-301i, three sutures may be placed above each of the sections 304a-304i (i.e., 33 sutures/11 plies=3 sutures/ply). The distance between two adjacent sutures may be chosen to be 0.86 inches (i.e., 2.59/ 3=0.86). Thus, as shown in FIG. 4(d), three sutures 204 may be placed atop section 304a of ply 301a such that the distance between two adjacent sutures is 0.86 inches.

Figure 4E:
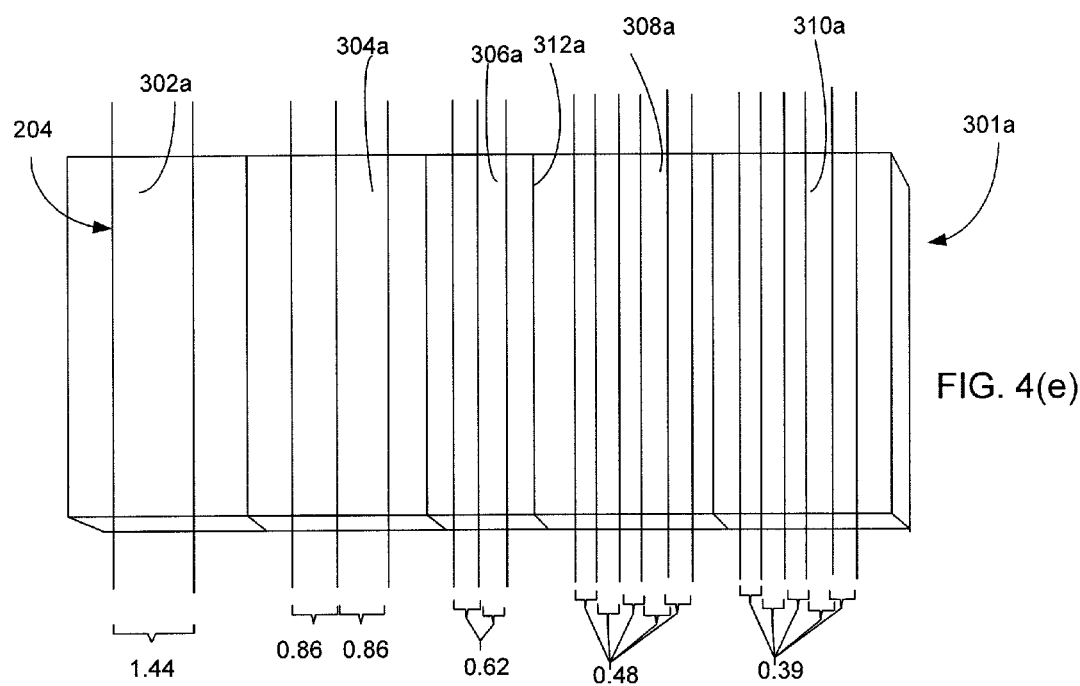

The same calculations may be performed for the remaining sections 306a, 308a, and 310a of the first ply 301a, and these calculations may yield the values outlined in FIG. 5. As shown in FIG. 4(e), sutures 204 may be placed above the remaining sections 306a, 308a, and 310a in line with these calculations. For example, with respect to section 310a of ply 301a, six sutures 204 (cell J5) may be placed atop section 310a and the distance between two adjacent sutures 204 may be 0.39 inches (cell K5, i.e., 2.353/6=0.39).

Figure 4F:
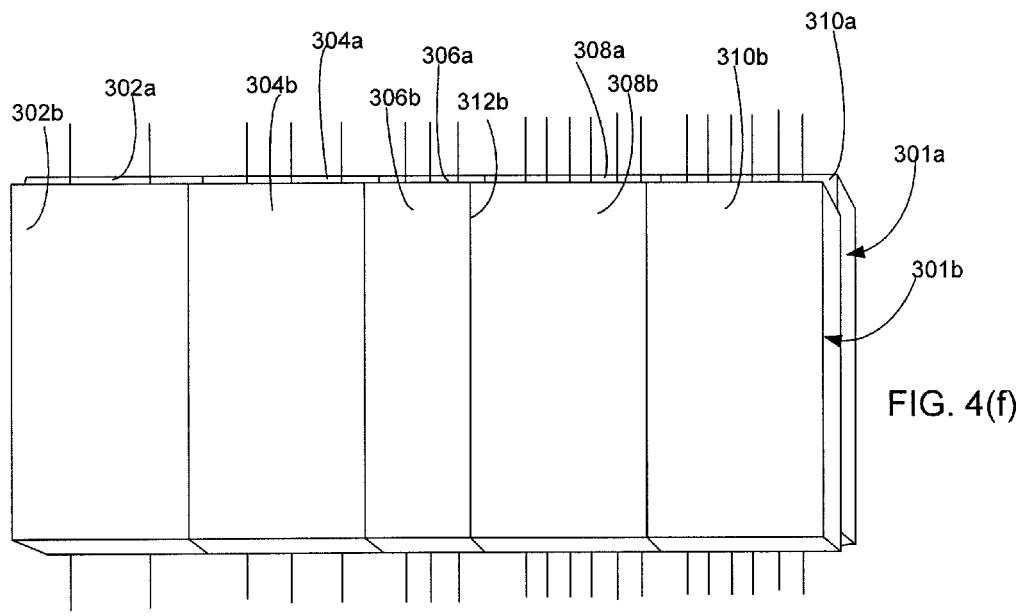
Figure 4G:
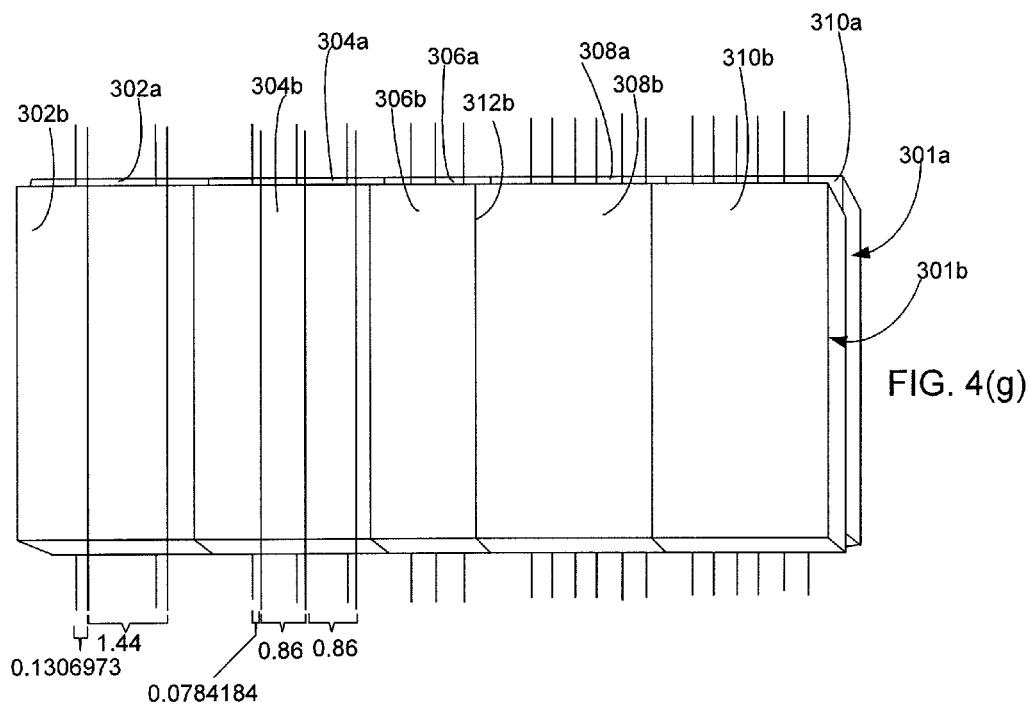

After all the required sutures 204 are placed on the first ply 301a, the second ply 301b may be placed atop the first ply 301a, as shown in FIG. 4(f). Then, as shown in FIG. 4(g), additional sutures 204 may be placed on the second ply 301b in line with the values outlined in FIG. 5. As noted, it may be desirable to ensure that the void spaces are not concentrated within one area, and are more or less evenly distributed within the panel 300. Thus, instead of placing the two sutures 204 of section 302b of ply 301b directly above the two sutures 204 of section 302a of ply 301a, the sutures 204 on section 302b may be staggered with respect to the sutures 204 on section 302a. More specifically, as shown in Col. L, the two sutures 204 on section 302b, the distance between which is 1.44 inches, may be staggered by 0.1306973 inches to ensure that all the 22 sutures in section 302 are evenly spaced from each other (i.e., 2.87/22=0.1306973).

In the same way, as shown in FIG. 4(g), the calculated number of sutures may be placed on section 304b of the second ply 301b. As will be appreciated, the distance between two adjacent sutures 204 on the section 304b of ply 301b may be 0.86 inches, and these sutures 204 on the section 304b may be staggered from the sutures 204 on section 304a of ply 301a by 0.07848 inches (i.e., 2.59/33=0.07848). Sutures 204 may similarly be placed atop the remaining sections 306b, 308b, and 310b of the ply 301b, and then the ply 301c (not specifically shown) may be placed on ply 30 lb and additional sutures may placed thereon in line with the calculations shown in FIG. 5. The process may be repeated until all the required sutures 204 (and plies) are placed on the ply 301k, and then the final ply 301l may be placed on the ply 301k. The sutures 204 may then be trimmed so that they do not extend beyond the plies 301a-k. The plies 301a-k, along with the sutures 204 between them, may then be placed in a vacuum bag and cured in an autoclave as discussed with respect to earlier embodiments. The cured panel may then be trimmed again to expose the sutures 204 and the panel may be submerged in a proteases enzyme solution that absorbs all the sutures 204. The resulting reference panel 300 (FIG. 4(a)) thus formed may have five different sections, each having a unique, close tolerance, evenly distributed void content. The reference panel 300 may then be used as a reference to test multiple composite panels with varying void contents, and to calibrate equipment (e.g., ultrasound equipment) for measurement of the void contents of panels.

Figure 6:
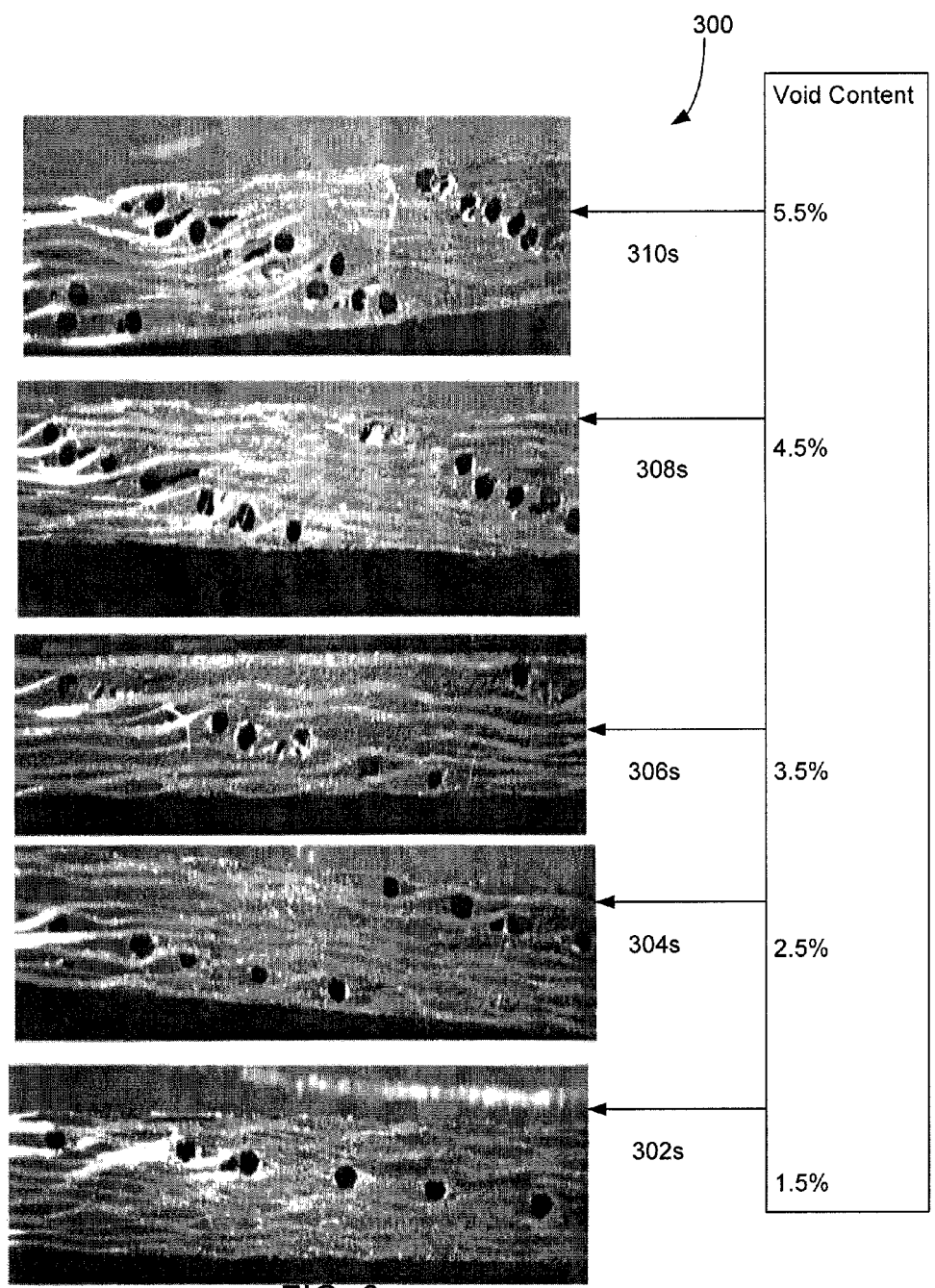
FIG. 6 shows images of an actual multi-ply panel created according to the teachings of the current invention, as viewable under a microscope.

An actual reference panel 300 was manufactured by using the values outlined in FIG. 5, to ensure the accuracy and working of the methods outlined above. FIG. 6 shows images of sides 302s, 304s, 306s, 308s, and 310s of the manufactured reference panel 300 as viewable under a microscope. As can be seen, each section 302s, 304s, 306s, 308s, and 310s has a generally evenly distributed void content that is different from the remaining sections. The actual panel 300 was also evaluated under high magnification to confirm that the voids created by the sutures 204 were of the same diameter as the sutures 204 and that the voids had not changed their position from their original locations.

It will be appreciated by those skilled in the art that while the figures show a reference panel 300 with five sections, that a panel having any number of differently configured sections with unique void contents may be manufactured in the same way in a single cure cycle, saving significant time and cost. Also, sutures having different radii may be used for the different sections to provide void spaces of different diameters. Mathematical models and software (such as Cad, Excel, et cetera) may be used to conduct the calculations used herein.

People of skill in the art will further appreciate that while chromic gut sutures 204 are expressly disclosed herein to create the void content as these sutures 204 are readily absorbable in an enzyme solution (e.g., a proteases enzyme solution) which does not adversely affect the panel 300, that other materials may be used to create the void content, and that different types of solutions may be used to absorb these materials, so long as it is ensured that these solutions will not react with or otherwise adversely affect the resin 104.

Further, while the description above generally outlines the usefulness of the porous composite panel 300 in a testing environment, its usage is not so limited. Indeed, the end-to-end void spaces 313 in the panel 300 may allow the panel 300 to be used for a variety of purposes. For example, the panel 300 may be used in the manufacturing of articles, with the void spaces 313 being utilized for the passage of conduits or wires through the panel 300; for instance, electrically conducting wires may be passed through the void spaces 313 to protect these wires from the elements and to ensure that these wires do not detract from the appearance of the article. Similarly, the void spaces 313 may be utilized as a means for effectuating fluid transfer through the panel 300; for example, fluids (such as radiator fluid) may be passed through the void spaces 313 to control the temperature of the panel 300 in high temperature environments. People of skill in the art will appreciate that the panel 300, because of the void spaces 313, may be lighter than a similar panel which does not contain the void spaces 313. Thus, in situations where weight of the panel 300 is more of a concern than its strength (e.g., tensile strength), multiple void spaces 313 may be introduced in the panel 300 in accordance with the methods outlined above to reduce the weight of the panel 300.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for making a porous composite panel having a desired void content comprising:
   laying on a surface a first ply of resin;
   placing on the first ply a filament;
   laying on the first ply and the filament a second ply of resin to form a laminate;
   curing the laminate in an autoclave to form an intermediate composite panel; and
   submerging the intemiediate composite panel in a proteases enzymes solution that dissolves the filament to create the porous composite panel;
   wherein the laminate is placed in a vacuum bag before it is cured in the autoclave;
   wherein the filament is a chromic gut suture;
   wherein the resin is pre-impregnated graphite epoxy resin.

2. The method of claim 1 wherein the filament includes a first filament and a second filament.

3. The method of claim 2 wherein a diameter of the first filament is greater than a diameter of the second filament.

4. The method of claim 2 wherein the laminate includes a third ply of resin and a fourth ply of resin, the third ply being laid atop the second ply and the fourth ply being laid atop the third ply.

5. The method of claim 4 further comprising the step of placing a third filament and a fourth filament on the third ply.

6. The method of claim 5 wherein a distance between the first filament and the second filament is greater than a distance between the third filament and the fourth filament.

7. The method of claim 5 wherein a diameter of the first filament is different from a diameter of at least one of the second filament, the third filament, and the fourth filament.

8. The method of claim 5 wherein the first filament and the second filament are respectively staggered with respect to the third filament and the fourth filament.

9. A method for manufacturing a composite panel having a desired void content comprising:
   laying on a surface a first ply of resin, the first ply having a predetermined length and height;
   provisionally dividing the first ply along its length into a first section and a second section;
   placing on the first section a first filament and a second filament, a length of the first filament and a length of the second filament being at least equal to the height of the first ply;
   placing on the second section a third filament and a fourth filament, a length of the third filament and a length of the fourth filament being at least equal to the height of the first ply, and a distance between the third filament and the fourth filament being greater than a distance between the first filament and the second filament;
   laying a second ply of resin atop the first ply and the first, second, third, and fourth filaments to form a first intermediate composite panel;
   curing the first intermediate composite panel in an autoclave to form a second intermediate composite panel; and
   submerging the second intermediate composite panel in a solution that dissolves the first, second, third, and fourth filaments, leaving void space in their place;
   wherein:
   the first, second, third and fourth filaments are chromic gut sutures;
   a diameter of the first and second filaments is generally equal;
   a diameter of the third and fourth filaments is generally equal and different from the diameter of the first and second filaments.

10. The method of claim 9, further comprising the step of placing the first intermediate panel in a vacuum bag before it is cured in the autoclave.

11. The method of claim 10, wherein the solution comprises proteases enzymes.

12. A method for making a multi-ply composite panel having a desired void volume comprising:
   laying on a surface a first ply of resin, the first ply having a predetermined length and height;
   provisionally dividing the first ply along its length into a first section, a second section, and a third section;
   placing on the first section a first filament and a second filament, a length of the first filament and a length of the second filament being at least equal to the height of the first ply;
   placing on the second section a third filament and a fourth filament, a length of the third filament and a length of the fourth filament being at least equal to the height of the first ply, and a distance between the third filament and the fourth filament being greater than a distance between the first filament and the second filament;
   placing on the third section a fifth filament and a sixth filament, a length of the fifth filament and a length of the sixth filament being at least equal to the height of the first ply, and a distance between the fifth filament and the sixth filament being greater than a distance between the third filament and the fourth filament;
   laying a second ply of resin atop the first ply and the first, second, third, fourth, fifth and sixth filaments;
   provisionally dividing the second ply along its length into a fourth section, a fifth section, and a sixth section, the fourth section being upwardly adjacent the first section, the fifth section being upwardly adjacent the second section, and the sixth section being upwardly adjacent the third section;
   placing on the fourth section a seventh filament and an eighth filament, a length of the seventh filament and a length of the eighth filament being at least equal to the height of the second ply;
   placing on the fifth section a ninth filament and a tenth filament, a length of the ninth filament and a length of the tenth filament being at least equal to the height of the second ply, and a distance between the ninth filament and the tenth filament being greater than a distance between the seventh filament and the eighth filament;
   placing on the sixth section an eleventh filament and a twelfth filament, a length of the eleventh filament and a length of the twelfth filament being at least equal to the height of the second ply, and a distance between the eleventh filament and the twelfth filament being greater than a distance between the ninth filament and the tenth filament;
   laying a third ply of resin atop the second ply and the seventh, eighth, ninth, tenth, eleventh, and twelfth filaments to form to form a first intermediate composite panel;
   curing the first intermediate composite panel in an autoclave to form a second intermediate composite panel; and
   submerging the second intermediate composite panel in a solution that dissolves each of the filaments.

13. The method of claim 12 wherein the first filament is not directly below the seventh filament or the eight filament.

14. The method of claim 13, wherein the filaments comprise biologic material.

15. The method of claim 14, wherein:
   the filaments comprise chromic gut sutures; and
   the solution comprises proteases enzymes.

16. The method of claim 15 further comprising the step of placing the first intermediate composite panel in a vacuum bag before it is cured.

17. The method of claim 16, wherein the resin comprises graphite and epoxy.

18. A method for making a porous composite panel having a desired void content comprising:
   forming a laminate; the laminate comprising a first ply of resin and a second ply of resin with an individual first suture and an individual second suture placed therebetween;
   curing the laminate in an autoclave to form an intermediate composite panel; and submerging the intermediate composite panel in a proteases enzyme solution that dissolves the first suture and the second suture;
   wherein the first suture and the second suture comprise chromic gut; and wherein a diameter of the first suture is different from a diameter of the second suture.

19. The method of claim 18 wherein the laminate includes a third ply of resin laid atop the second ply and a third suture and a fourth suture placed therebetween.

20. The method of claim 19 wherein the first suture is staggered with respect to the third suture.

21. The method of claim 20 wherein a first distance between the first suture and the second suture and a second distance between the third suture and the fourth suture are unequal.

22. The method of claim 18 wherein the resin is pre-impregnated graphite epoxy resin.

\* \* \* \* \*

UNITED STATES PATENT AND TRADEMARK OFFICE
CERTIFICATE OF CORRECTION

PATENT NO. : 8,894,787 B2  Page 1 of 1
APPLICATION NO. : 13/593119
DATED : November 25, 2014
INVENTOR(S) : Bryce Boe It is certified that error appears in the above-identified patent and that said Letters Patent is hereby corrected as shown below:

In the Claims

Column 10, Line 57, Claim 1, "intemiediate" should read --intermediate--.

Signed and Sealed this
Twenty-ninth Day of September, 2015

Michelle K. Lee
*Director of the United States Patent and Trademark Office*